May 20, 1930. S. J. BARTON 1,759,083
CAR WHEEL
Filed July 14, 1927
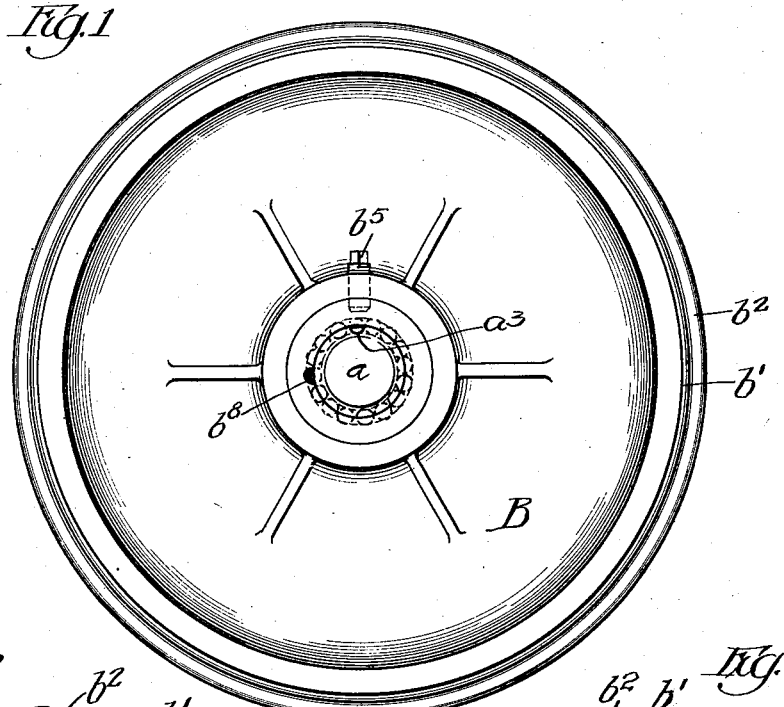
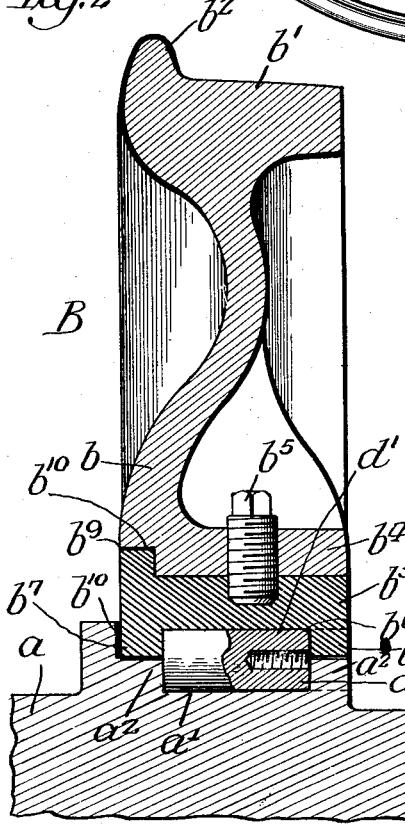
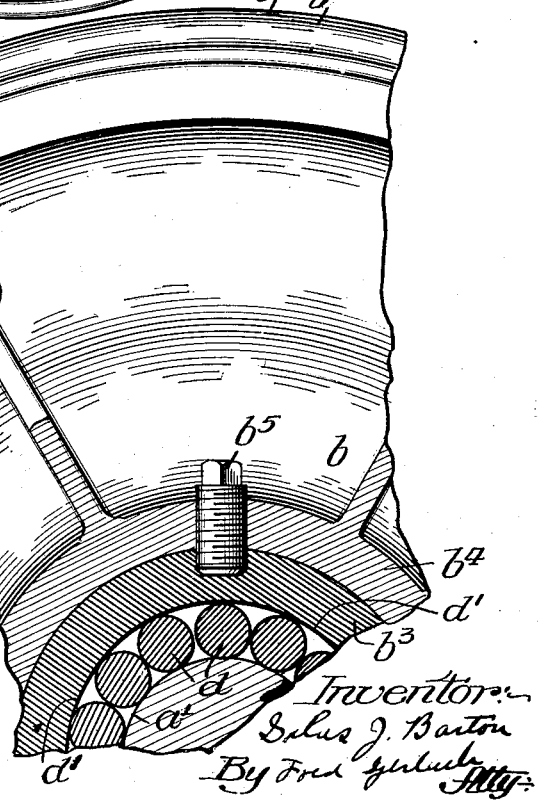
Inventor
Silas J. Barton
By Fred Gerlach Atty.

Patented May 20, 1930

1,759,083

UNITED STATES PATENT OFFICE

SILAS J. BARTON, OF CHICAGO, ILLINOIS

CAR WHEEL

Application filed July 14, 1927. Serial No. 205,558.

The invention relates to car-wheels and more particularly to that type in which the wheel and axle are relatively rotatable.

The object of the invention is to provide an improved wheel of this type in which anti-friction rollers are interposed between the axle and the wheel, in which the rollers serve to lock the wheel and axle against relative axial movement, in which the annular bearing surfaces on the axle and wheel respectively are uninterruptedly formed, and in which provision is made, if desired, for replacing the hub in event of wear.

The invention consists in the several novel features hereinafter set forth and more particularly defined by the claims at the conclusion hereof.

In the drawing: Fig. 1 is a side elevation of a car-wheel axle embodying the invention. Fig. 2 is a transverse section and Fig. 3 is a longitudinal section on a larger scale.

The invention is exemplified in a structure comprising an axle $a$ which is non-rotatably secured to the truck of the car in any suitable manner, and a wheel B comprising a body $b$, a tread $b'$, with a flange $b^2$, and a hub $b^3$ which is separately formed from the body and secured by screws $b^5$ in a boss $b^4$ integrally formed with the wheel-body. The axle is provided in its outer periphery with an annular channel or groove $a'$, and the hub $b^3$ is provided with a complementary annular channel or groove $b^6$. A series of anti-friction rollers $d$ fit in the grooves $a'$ and $b^6$. At the sides of the groove $b^6$, integral walls $b^7$ are formed to engage the ends of the rollers, and the axle is provided with walls $a^2$ which engage the ends of the rollers, so that the latter will serve to interlock the axle and the wheel against relative axial movement. The walls $b^7$ and $a^2$ at the outer side of the wheel are formed with semi-circular notches $b^8$ and $a^3$ respectively, which, when in registry, form a cylindrical opening corresponding to one of the rollers, so that the rollers may be individually inserted endwise into the grooves $a'$ and $b^6$. When the notches are out of registry, it will be impossible to remove the rollers from the groves in which they run. There is practically no likelihood of a roller being in complete registry with the notches while the latter are in registry during the rotation of the wheel, so that special means for holding the rollers in their runways will be unnecessary. A characteristic of the construction described is that the peripheral bearing surfaces of the rollers are continuous or uninterrupted by any elements provided for the insertion of the rollers. In practice, it sometimes becomes necessary to remove the rollers, and for this purpose, each roller has formed in its outer end a screw-threaded socket $d'$, so that a threaded tool may be inserted through the notches $a^3$, $b^8$ into engagement with, and connected to, each roller, for the purpose of withdrawing the roller. If desired, the hub $b^3$ may be provided with an integral flange $b^9$ which is confined in a recess $b^{10}$ in the body of the wheel.

In assembling the wheel structure, the hub $b^3$ is secured in the wheel-body and slipped over the axle. The wheel is then rotated to bring notch $b^8$ into registry with the notch $a^3$ on the axle. The rollers $d$ can then be individually inserted endwise into the bearing grooves, each roller being displaced circumferentially away from the notches after it has been inserted. When the rollers have been inserted, the wheel and axle will be interlocked against relative axial movement. If the hub $b^3$ becomes worn, the rollers may be individually removed through the registering notches $b^8$, $a^3$, to permit the hub $b^3$ to be slipped off the axle. In the event of the breakage of a wheel-body, or if for any other reason it should become desirable to effect a replacement thereof, it can be removed by loosening the screws $b^5$ to permit the wheel-body to be slipped off the hub $b^3$.

The invention exemplifies a wheel and axle structure in which the rollers are interposed between the axle and the wheel and in which the bearing surfaces on which the rollers travel are uninterruptedly or continuously formed and in which provision is made for inserting the rollers endwise for that purpose; also one in which the walls of the ends of the rollers are integrally formed with the hub and axle respectively, so the rollers will serve to interlock the wheel and axle against relative axial movement. The rollers are provided with means to receive a tool for their individual removal from bearing grooves when that becomes necessary.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination of a non-rotatable axle having an annular groove in its outer periphery and integral walls forming both ends of the groove, a car-wheel rotatable around the axle and comprising a tread and a hub having a corresponding annular groove in its inner periphery and integral walls forming both ends of said groove, and rollers fitting into both of said grooves, and engaging the walls at both ends of the grooves in the hub and axle to lock the wheel and axle against relative axial movement in either direction, the hub and axle each having a notch through the side-walls engaged by one end of the rollers, through which the rollers may be individually inserted into the grooves only when the notches are in registry.

2. The combination of a non-rotatable axle having an annular groove in its outer periphery, a car-wheel rotatable around the axle and comprising a tread and a hub having a corresponding annular groove in its inner periphery, and rollers fitting into both of said grooves, the latter having side-walls engaging the ends of the rollers to lock the wheel and axle against relative axial movement, the hub and axle each having a notch through the side walls at one end of the rollers, through which the rollers may be individually inserted into the grooves only when the notches are in registry, the rollers being provided with means for an interlocking connection with a tool for withdrawing them from the grooves.

3. The combination of a non-rotatable axle having an annular groove in its outer periphery and integral walls at both ends of the groove, a car-wheel rotatable around the axle and comprising a tread, a body and a separately formed hub replaceably secured in the body, the hub having a corresponding annular groove in its inner periphery and integral walls forming both ends of the groove, and rollers fitting into both of said grooves, and engaging the end walls on the hub and axle to lock the wheel and axle against relative axial movement in either direction, the hub and axle each having a notch through the side walls at one end of the rollers, through which the rollers may be individually inserted into the grooves only when the notches are in registry.

Signed at Chicago, Illinois, this 29th day of June, 1927.

SILAS J. BARTON.